(12) United States Patent
Laake et al.

(10) Patent No.: US 9,015,014 B2
(45) Date of Patent: Apr. 21, 2015

(54) NEAR SURFACE LAYER MODELING

(75) Inventors: Andreas W. Laake, Kingston (GB); Claudio Strobbia, Heliopolis (EG); Andrew Cutts, Wokingham (GB)

(73) Assignee: WesternGeco L.L.C., Houston, TX (US)

( * ) Notice: Subject to any disclaimer, the term of this patent is extended or adjusted under 35 U.S.C. 154(b) by 1611 days.

(21) Appl. No.: 12/124,218

(22) Filed: May 21, 2008

(65) Prior Publication Data

US 2008/0294393 A1 Nov. 27, 2008

Related U.S. Application Data

(60) Provisional application No. 60/940,023, filed on May 24, 2007.

(51) Int. Cl.
G06G 7/48 (2006.01)
G01V 11/00 (2006.01)

(52) U.S. Cl.
CPC .................................. *G01V 11/00* (2013.01)

(58) Field of Classification Search
CPC .................................................. G06F 17/5009
USPC .................................................. 703/6; 702/11
See application file for complete search history.

(56) References Cited

U.S. PATENT DOCUMENTS

| | | | |
|---|---|---|---|
| 3,703,133 A * | 11/1972 | Yost, Jr. ........................... | 356/51 |
| 4,698,759 A | 10/1987 | Eliason et al. | |
| 5,053,778 A | 10/1991 | Imhoff | |
| 5,321,613 A | 6/1994 | Porter et al. | |
| 5,671,136 A | 9/1997 | Willhoit, Jr. | |
| 5,781,503 A | 7/1998 | Kim | |
| 5,905,657 A * | 5/1999 | Celniker ........................... | 703/5 |
| 5,987,388 A | 11/1999 | Crawford et al. | |
| 6,016,461 A | 1/2000 | Thore | |
| 6,028,819 A | 2/2000 | Mullarkey et al. | |
| 6,035,255 A * | 3/2000 | Murphy et al. .................. | 702/11 |
| 6,094,620 A | 7/2000 | Gasparotto et al. | |
| 6,519,205 B1 | 2/2003 | Baeten et al. | |
| 6,597,992 B2 | 7/2003 | Rooney et al. | |
| 6,651,007 B2 | 11/2003 | Ozbek | |

(Continued)

FOREIGN PATENT DOCUMENTS

| | | |
|---|---|---|
| CN | 1387051 A | 12/2002 |
| WO | 9822835 A1 | 5/1998 |

(Continued)

OTHER PUBLICATIONS

Harris, et al., Focusing Oil and Gas Exploration in Eastern Yemen by using satellite images and elevation data alongside conventional 2D seismic, CSEG Recorder, Feb. 2003, 5 pages.

(Continued)

*Primary Examiner* — Kamini S Shah
*Assistant Examiner* — Luke Osborne

(57) ABSTRACT

A method for generating a three dimensional (3D) model of a near surface layer. In one implementation, the method may include generating a one dimensional (1D) geologic model of the near surface layer, converting the 1D geologic model to a two dimensional (2D) geologic model of the near surface layer, converting the 2D geologic model to a 3D geologic model of the near surface layer, and converting the 3D geologic model to a 3D elastic geologic model of the near surface layer.

18 Claims, 5 Drawing Sheets

(56) References Cited

U.S. PATENT DOCUMENTS

| | | | |
|---|---|---|---|
| 6,665,617 | B2 | 12/2003 | Shobayashi |
| 6,686,917 | B2 | 2/2004 | Tarr |
| 6,885,947 | B2 | 4/2005 | Xiao et al. |
| 7,031,838 | B1 | 4/2006 | Young et al. |
| 7,218,573 | B1 | 5/2007 | Laake |
| 7,330,799 | B2 | 2/2008 | Lefebvre et al. |
| 7,408,836 | B2 | 8/2008 | Muyzert et al. |
| 7,483,917 | B2 | 1/2009 | Sullivan et al. |
| 8,509,027 | B2 | 8/2013 | Strobbia et al. |
| 2003/0083819 | A1 | 5/2003 | Rooney et al. |
| 2003/0198404 | A1 | 10/2003 | Frisken et al. |
| 2005/0086227 | A1 | 4/2005 | Sullivan et al. |
| 2005/0114031 | A1 | 5/2005 | Thambynayagam et al. |
| 2005/0157589 | A1 | 7/2005 | Laake |
| 2005/0171700 | A1 | 8/2005 | Dean |
| 2006/0036367 | A1 | 2/2006 | Brewster |
| 2006/0136162 | A1 | 6/2006 | Hamman et al. |
| 2007/0195645 | A1 | 8/2007 | Laake |
| 2008/0040349 | A1 | 2/2008 | Rahmes et al. |
| 2008/0195321 | A1 | 8/2008 | Levin |
| 2008/0294393 | A1 | 11/2008 | Laake et al. |
| 2009/0122645 | A1 | 5/2009 | Guigne et al. |
| 2009/0161488 | A1 | 6/2009 | Ferber et al. |
| 2010/0091611 | A1 | 4/2010 | Laake |
| 2010/0119118 | A1 | 5/2010 | Laake |
| 2011/0085418 | A1 | 4/2011 | Laake et al. |
| 2011/0120724 | A1 | 5/2011 | Krohn |

FOREIGN PATENT DOCUMENTS

| | | |
|---|---|---|
| WO | 0000843 A1 | 1/2000 |
| WO | WO2005119298 A3 | 12/2005 |

OTHER PUBLICATIONS

Bubeqi, et al., Improving structural interpretation using modern techniques for solving complex problems: from near surface anomalies to pre stack depth migration—Block 32 Yemen, 2005 CSEG National Convention, pp. 57-60.
International Search Report and Written Opinion, dated Sep. 2, 2008, for PCT application PCT/US2008/064357, 13 pages.
Pfleiderer, et al, 3D Visualisation of Vienna's Subsurface, Offshore Europe Proceedings, SPE 65132, Feb. 1, 2004, 6 pages.
Sobel, "Spatial Differentiation—3×3 Window Table," Pattern Classification and Scene Analysis, John Wiley & Sons: New York, eds. Duda et al., 1973: pp. 271-272.
Taner, M. T., Koehler, F., and Alhilali, K. A., "Estimation and Correction of Near-Surface Time Anomalies," Geophysics, Aug. 1974, vol. 39(4): pp. 441-463.
McMechan, G. A., and Yedlin, M. J., "Analysis of Dispersive Wave by Wave Field Transformation", Geophysics, Jun. 1981, vol. 46(6): pp. 869-874.
Palmer, D., "An Introduction to the Generalized Reciprocal Method of Seismic Refraction Interpretation," Geophysics , Nov. 1981, vol. 46(11): pp. 1508-1518.
Short et al. (Baker, Hayden, Hayden et al.), "Chapter 1: Introduction: Regional Landforms Analysis; Chapter 11: Geomorphological Mapping; Chapter 12: Global Geomorphology: Outlook for the Future," Geomorphology from Space a global Overview of Regional Landforms, 1986: pp. 1-73, <http://11geoinfo.amu.edu.pl/wkp/geos/GEO_COMPLETE_TOC.html>.
Rothman, D. H, "Automatic Estimation of Large Residual Statics Corrections," Geophysics, Feb. 1986, vol. 51(2): pp. 332-336.
Schmidt, R. O., "Multiple Emitter Location and Signal Parameter Estimation", IEE Transactions on Antennas and Propagation, Mar. 1986, vol. 34(3): pp. 276-280.
Zhu, X., Sixta, D. P., and Angstman, B. G., "Tomostatics: Turning-Ray Tomography + Static Corrections," The Leading Edge, Dec. 1992, vol. 11(12): pp. 15-23.
Bennett, G., "3D seismic refraction for deep exploration targets", The Leading Edge, Feb. 1999, vol. 18(2): pp. 186-191.

Marsden, D., "Static Corrections—A Review, Part 1," The Leading Edge, Jan. 1993, vol. 12(1): pp. 43-49.
Marsden, D., "Static Corrections—A Review, Part 2," The Leading Edge, Feb. 1993, vol. 12(2): pp. 115-120.
Marsden, D., "Static Corrections—A Review, Part 3," The Leading Edge, Mar. 1993, vol. 12(3): pp. 210-216.
Marion, D., Insalaco, E., Rowbotham, P., Lamy, P. and Michel, B., "Constraining 3D static models to seismic and sedimentological data: a further step towards reduction of uncertainties", SPE 65132, SPE International, Oct. 2000: pp. 1-6.
Barmin, M. P., Ritzwoller, M. H. and Levshin, A. L., "A Fast and Reliable Method for Surface Wave Tomography", Pure and Applied Geophysics, Aug. 2001, vol. 158(8): pp. 1351-1375.
Shaohua, Z., Feng, Y., Peiming, L., Zhenhua, L. and Xinwen, L., "Applying 3D seismic in a complex mountainous area of Tarim Basin", The Leading Edge, Sep. 2002, vol. 21(9): pp. 902-905.
Al Juaidi, F., Millington, A. and McLaren, S. J., "Merged remotely sensed data for geomorphological investigations in deserts: examples from central Saudi Arabia", The Geographical Journal, Jun. 2003, vol. 169(2): pp. 117-130.
Insley, M., and Laake, A., "Seismic Quality Analysis in Algeria: Application of Earth Observation Data Sets to Oil & Gas Exploration," PESGB London Evening Meeting, 2003: pp. 1-5.
Socco, L.V. and Strobbia, C., Surface-wave method for near-surface characterization: a tutorial, Near Surface Geophysics, Nov. 2004, vol. 2(4): pp. 165-185.
Bohlen, T., Kugler, S., Klein, G., and Theilen, F., "1.5D inversion of lateral variation of Scholte-wave dispersion", Geophysics, 2004, 69(2): pp. 330-344.
Hayashi, K. and Suzuki, H., "CMP Cross-Correlation Analysis of Multi-Channel Surface-Wave Data", Exploration Geophysics, 2004, 35(1): pp. 7-13.
Insley, M., and Laake, A., "Satellite Based Seismic Technology, Case Study: Berkine Basin, Algeria," 66th EAGE Conference and Exhibition, Jun. 2004: pp. 1-4.
Laake, A. and Insley, M., "Applications of satellite imagery to seismic survey design," The Leading Edge, Oct. 2004, vol. 23(10): pp. 1062-1064.
Zoran, M., "Data fusion technique for analysis of Vrancea seismic region, Romania", Remote Sensing for Environmental Monitoring, GIS Applications, and Geology III, Feb. 2004: pp. 395-402.
Shapiro, N. M., Campillo, M., Stehly, L., Ritzwoller, M. H., High Resolution Surface-Wave Tomography from Ambient Seismic Noise, Science, Mar. 2005, 307 (5715), pp. 1615-1618.
Morgan, C., "Developing a Seismic Viewer Extension for ArcMap", ESRI Petroleum User Group Conference, 2005: pp. 1-20.
Laake, A., and Tewkesbury, A., "Vibroseis Data Quality Estimation from Remote Sensing Data," EAGE 67th Conference and Exhibition, Jun. 2005: pp. 1-4.
Laake, A., "Application of Landsat Data to Seismic Exploration—Case Study from Kuwait", Kuwait First International Remote Sensing Conference and Exhibition, Sep. 2005.
Strobbia, C. and Foti, S., "Multi-offset phase analysis of surface wave data (MOPA)", Journal of Applied Geophysics, Aug. 2006, vol. 59(4): pp. 300-313.
Grandjean, G., Bitri, A., "2M-SASW: Multifold Multichannel Seismic Inversion of Local Dispersion of Rayleigh Waves in Laterally Heterogeneous Subsurfaces: Application to the Super-Sauze Earthflow, France", Near Surface Geophysics, Dec. 2006, vol. 4(6): pp. 367-375.
Laake, A., Al-Alawi, H., and Gras, R., "Integration of Remote Sensing Data with Geology and Geophysics—Case Study from Bahrain," GEO 2006 Middle East Conference and Exhibition, Mar. 2006: p. 1.
Bensen, G. D., Ritzwoller, M. H., Barmin, M. P., Levshin, A. L., Lin, F., Moschetti, M. P., Shapiro, N. M. and Yang, Y., "Processing seismic ambient noise data to obtain reliable broad-band surface wave dispersion measurements", Geophysical Journal International, 2007, vol. 169: pp. 1239-1260.
Laake, A., and Cutts, A., "The Role of Remote Sensing Data in Near Surface Seismic Characterization," First Break, Feb. 2007, vol. 25(2): pp. 61-65.

(56) References Cited

OTHER PUBLICATIONS

Taner, M. T., Berkhout, A. J., Treitel, S., and Kelamis, P. G., "The Dynamics of Statics," The Leading Edge, Apr. 2007, vol. 26(4): pp. 396-402.

Cutts, A., and Laake, A., "Vibrator Data Quality Prediction from Remote Sensing-based Near-surface Analysis," Paper B005, 70th EAGE Conference and Exhibition, Jun. 2008: pp. 1-5.

Laake, A., Strobbia, C., Cutts, A., "Integrated Approach to 3D Near-surface Characterization," Paper D033, 70th EAGE Conference and Exhibition, Italy, Jun. 2008: pp. 1-5.

Laake, A., Strobbia, C., and Cutts, A., "Integrated Approach to 3D Near Surface Characterization in Desert Regions," First Break, Nov. 2008, vol. 26(11): pp. 109-112.

Lijuan, S., Xianyi, J., Jianqun, D., and Lijun, X., "A new technology of optimizing survey design on real—surface model", SEG Technical Program Expanded Abstracts, 2008: pp. 158-162.

Ross, W. S., Lee, S., Diallo, M. S., Johnson, M. L., Shatilo, A. P., Anderson, J. E., Martinez A., Characterization of Spatially Varying Surface Waves in a Land Seismic Survey, SEG Technical Program Expanded Abstracts, 2008: pp. 2556-2560.

Ferber, R., Velasco, L. and West, L., "Interferometric Rayparameter Estimation and Applications," Paper V001, 71st EAGE Conference, Jun. 2009: pp. 1-5.

Laake, A., Zaghloul, A. and Strobbia, C., "Geomorphology—Understanding the Near-surface Impact on Seismic Data," 71st EAGE Conference and Exhibition, EAGE Workshop 10, Jun. 2009.

International Search Report and Written Opinion of PCT Application No. PCT/US2009/059250 dated May 14, 2010: pp. 1-12.

Strobbia, C., Vermeer, P., Laake, A., Glushenko, A.and Re, S., "Near Surface Geoscience—Surface waves: processing, inversion and removal", First Break, Aug. 2010, vol. 28(8): pp. 85-91.

Laake, "Integration of Satellite Imagery, Geology and Geophysical Data," Earth and Environmental Sciences, Dec. 2011: pp. 467-492.

International Search Report and Written Opinion of PCT Application No. PCT/US2010/051969 dated May 30, 2011.

Duda, et al., "Pattern Classification and Scene Analysis", John Wiley and Sons, 1973, pp. 271-272.

Hayashi, et at, "CMP analysis of multi-channel and multi-shot surface-wave data", Seg Int'l Exposition and 72nd Annual Meeting, Oct., 2002, pp. 1-4.

Lai, et al., "Simultaneous Inversion of Rayleigh Phase Velocity and Attenuation for Near-Surface Slte Characterization", Georgia Institute of Technology, School of Civil and Environmental Engineering, 1998, pp. 370.

Xia, et al., "Estimation of Near-Surface Shear Wave Velocity by Inversion of Rayleigh Waves", Geophysics, vol. 64(3). May, 1999, pp. 691-700.

\* cited by examiner

NEAR SURFACE LAYER MODELING

CROSS-REFERENCE TO RELATED APPLICATIONS

This application claims benefit of U.S. provisional patent application Ser. No. 60/940,023, filed May 24, 2007, which is incorporated herein by reference.

BACKGROUND

1. Field of the Invention

Implementations of various technologies described herein generally relate to seismic data processing and more particularly to near surface layer modeling.

2. Description of the Related Art

The following descriptions and examples do not constitute an admission as prior art by virtue of their inclusion within this section.

Variations of surface elevation and elastic properties, such as seismic velocities, result in time shifts in the surface seismic data that affect the signal level and definition of the seismic signal and render the attenuation of coherent noise difficult. The traditional method of generating an elevation model followed by a simple laterally nearly invariant velocity model often does not correct the perturbations sufficiently. For example, point-receiver data suffer from a generally lower signal and signal-to-noise level and are therefore affected by perturbations. However, point-receiver data offer access to detailed information about elevation and velocity variations in the near surface layers.

SUMMARY

Described herein are implementations of various technologies for a method for generating a three dimensional (3D) model of a near surface layer. In one implementation, the method may include generating a one dimensional (1D) geologic model of the near surface layer, converting the 1D geologic model to a two dimensional (2D) geologic model of the near surface layer, converting the 2D geologic model to a 3D geologic model of the near surface layer, and converting the 3D geologic model to a 3D elastic geologic model of the near surface layer.

Described herein are implementations of various technologies for a computer-readable medium having stored thereon computer-executable instructions which, when executed by a computer, cause the computer to: generate a one dimensional (1D) geologic model of a near surface layer, merge multispectral remote sensing data with the 1D geologic model to generate a two dimensional (2D) geologic model of the near surface layer, and merge a digital elevation model (DEM) of the near surface layer with the 2D geologic model to generate a three dimensional (3D) geologic model of the near surface layer.

Described herein are implementations of various technologies for a computer system, which may have a processor and a memory having program instructions executable by the processor to: generate a one dimensional (1D) geologic model of a near surface layer, merge multispectral remote sensing data with the 1D geologic model to generate a two dimensional (2D) geologic model of the near surface layer, and merge a digital elevation model (DEM) of the near surface layer with the 2D geologic model to generate a three dimensional (3D) geologic model of the near surface layer, add standardized elastic rock properties to the 3D geologic model to generate a 3D elastic geologic model of the near surface layer, and calibrate the 3D elastic geologic model with seismic data, non seismic data or both.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

Various techniques described herein are implemented with reference to coherent noise in near surface layer. As such, before describing implementations of these techniques, it may be useful to describe the various problems discovered in the near surface layer.

Figure 1:
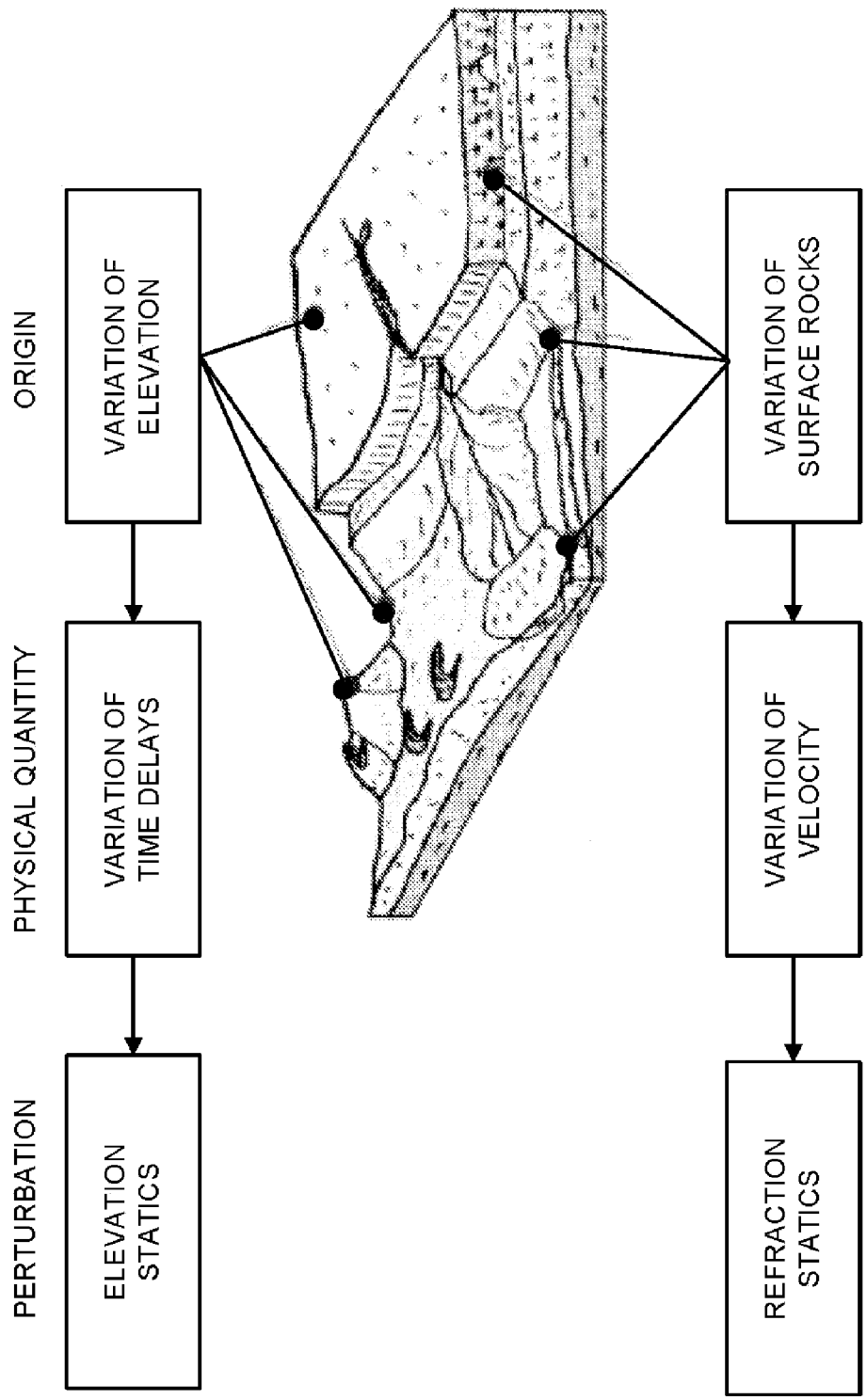
FIG. 1 illustrates a schematic diagram of the origin of perturbations in surface seismic data.

Surface seismic data suffer from heterogeneities that exist in the near surface layer. Examples of such heterogeneities include topography and lateral and vertical variations of geology. These variations affect the propagation of seismic waves within the near surface layer by introducing locally varying time shifts into the acquired seismic data. There are two main categories of perturbations: elevation statics, which originate from variations in the topography; and refraction statics, which result from variations in the near-surface propagation velocity of P-waves. FIG. 1 illustrates the origin of perturbations in surface seismic data.

State-of-the art seismic data processing distinguishes between elevation statics and refraction statics. Elevation statics may be corrected when the elevation of each sensor is known and a P-wave velocity close to the surface is assumed. Based on this assumption, refracted wave modes are identified because they propagate in the most consolidated layer close to the surface, which usually generates the first and strongest events in a seismogram. These events are referred to as first breaks. To correct elevation static variations, the sensor elevation is measured. A uniform surface velocity is assumed, which is then used to correct for the time shifts.

Figure 2:
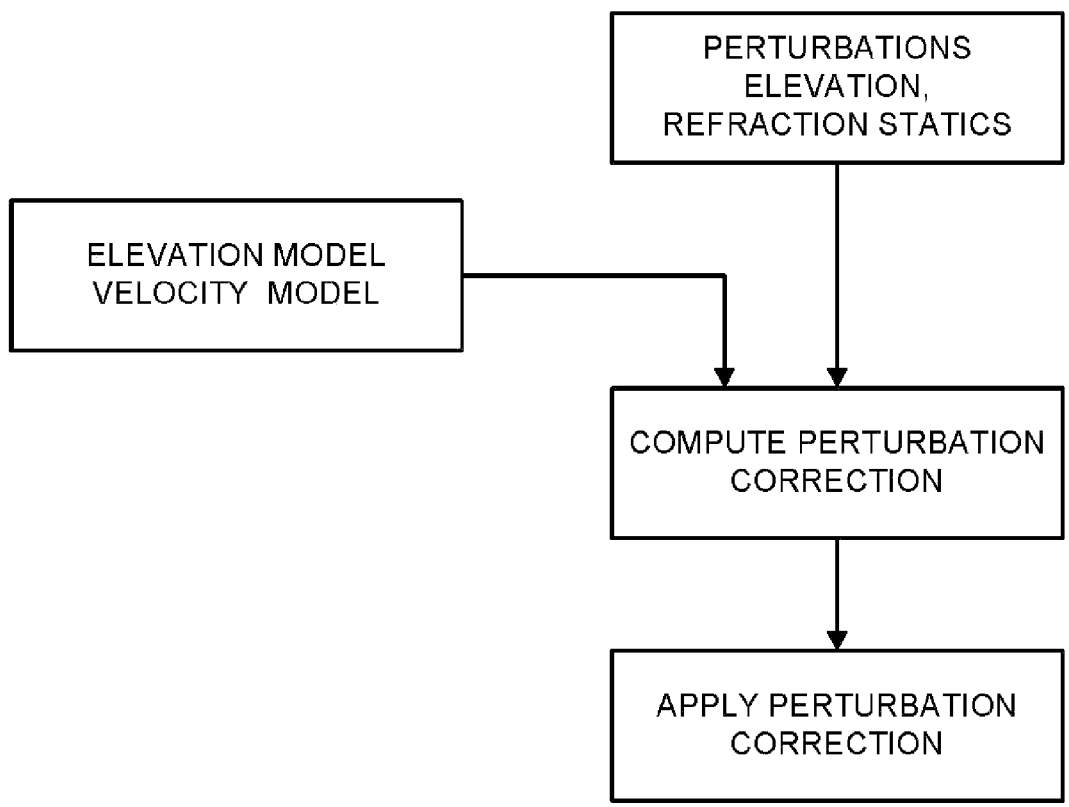
FIG. 2 illustrates a process for correcting refraction static variations.

The correction of refraction static variations involves reliable selection of the first breaks, which in turn demands ideally constant velocity in the near surface. Under this assumption, the linear moveout of the first breaks in the seismogram is used to estimate the first-break velocity. FIG. 2 illustrates a process for correcting refraction static variations.

The critical step for both corrections is the estimation of the correction velocities. The model, which is used in state-of-the art static corrections, is generally simple and not correlated with the prospect surface geology. The assumption that the velocities are laterally and vertically nearly constant proves unrealistic in a large number of cases. This is particularly true for point-receiver data, which suffer from generally lower signal level. Point receivers are also susceptible to the perturbations at each sensor location. Therefore, a need exists for a method for correction velocity estimation that considers the near-surface geology.

Figure 3:
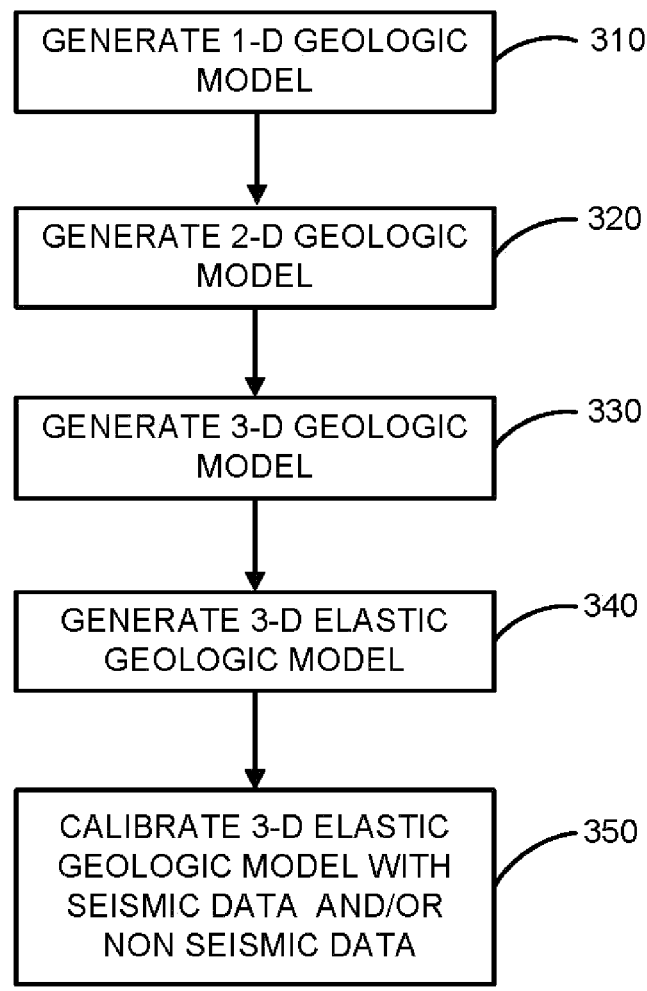
FIG. 3 illustrates a method for generating a three dimensional (3D) model of a near surface layer in accordance with implementations of various technologies described herein.

FIG. 3 illustrates a method for generating a three dimensional (3D) model of a near surface layer in accordance with implementations of various technologies described herein. In one implementation, a near surface layer may be defined as the first 100 m-150 m below the surface of the earth. At step 310, a one dimensional (1D) geologic model of a near surface layer of interest may be generated or built. The 1D geologic model may be generated by first identifying the near surface layer of interest in a geologic map that contains the near surface layer of interest. Then, the near surface layer of interest may be identified in a stratigraphic column that contains the near surface layer of interest. The 1D geologic model provides the geological time or age of the near surface layer of interest. This information may be used to assess risk for waves traveling within the near surface layer and their scattering.

Figure 4:
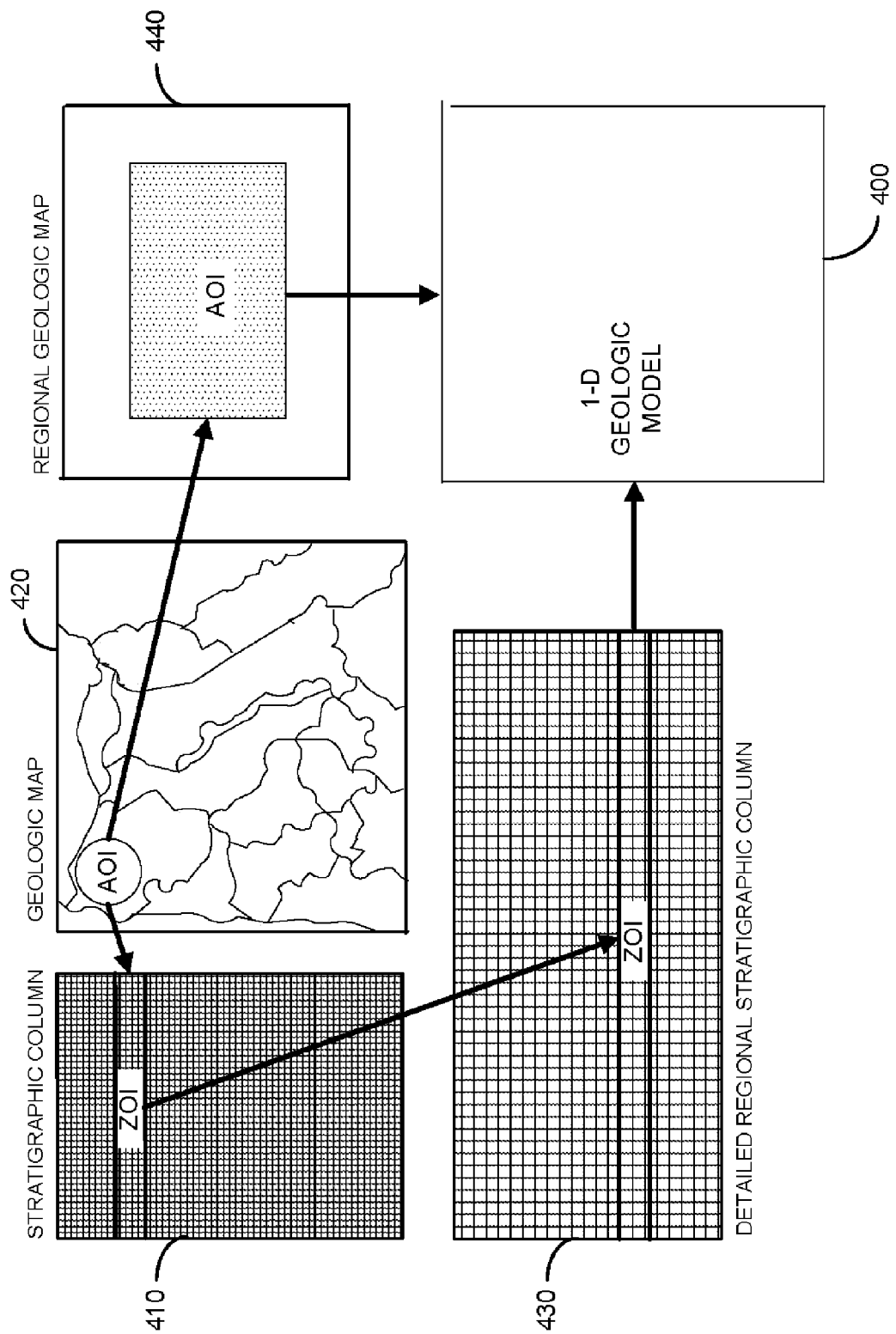
FIG. 4 illustrates a 1D geologic model generated using a stratigraphic column and a geologic map in accordance with various implementations described herein.

FIG. 4 illustrates a 1D geologic model 400 generated using a stratigraphic column 410 and a geologic map 420 in accordance with various implementations described herein. The stratigraphic column 410 may be commonly referred to as a generalized stratigraphic column, which provides an overview of the rock types, their deposition environment, and the correlation with geologic age for a large area. The geologic map 420 provides a two dimensional (2D) outline of the distribution of the rocks at the surface as well as information about the general geologic and tectonic setting of the area of interest (AOI). The rock units shown for the AOI on the geologic map allow identification of the zone of interest (ZOI) in the stratigraphic column 410. Both the AOI and the ZOI define the near surface layer of interest. Based on the information in the stratigraphic column 410 and provided by other geologic literature, the detailed stratigraphic column 430 for the ZOI can be drawn and the main stratigraphic units for the surface rocks identified. The regional geologic map 440 may provide an outline of the lateral distribution of the ZOI layers in the AOI. A schematic stratigraphic column for the surface rocks may also be provided, which assists in building the 1D geologic model 400.

At step 320, the 1D geologic model of the near surface layer of interest maybe expanded or converted to a two dimensional (2D) geologic model of the near surface layer of interest. In one implementation, multispectral remote sensing data may be merged with the 1D geologic model to generate a surface lithology map, which is the 2D geologic model. Multispectral remote sensing data are maps that are obtained from satellite or airplane based electromagnetic sensors. They provide a multiplicity of electromagnetic readings in the visible and infrared wavelength range. Different rocks at the earth's surface may be discriminated on these maps using spectroscopy. In this manner, the multispectral remote sensing data provide the lateral information to extend the surface geologic model (1D model) to the 2D geologic model. In one implementation, the 2D geologic model may then be georeferenced and imported into a geographic information system (GIS) database. It should be understood however that the data may be georeferenced and imported at any step during this process. The 2D geologic model may be georeferenced and imported into the GIS database to ensure spatially correct correlation and interpretation of all data sets. In one implementation, the 2D geologic model may be a high resolution geologic map.

In one implementation, the multispectral remote sensing data may be decomposed into pixels by separating multi-band satellite data set into individual bands, which may be represented as image layers in the database. Each band in the image layer may then be split into individual pixels. This process may be represented by S=pixel matrix [Si (x,y)], where S represents the satellite image layer, i represents the band of satellite image in the database and (x, y) represent east and north coordinates. Once the pixel matrix is completed on a georeferenced grid, each pixel may be represented as a vector of values from each image layer, as shown in:

$$P(x,y)=(S1, S2, \ldots Sn),$$

where n is the number of image layers in the database.

The image layers in the database may be processed using algorithms between various Si across the entire East-North plain, which is the matrix created from all x and y values. The algorithms may include correlating pixel values from two or more image layers to provide information of consistency between the image layers, calculating the difference between pixel values to show the difference between the image layers, and any other algorithm that combines pixel values from two or more image layers, e.g., multiplying the pixel values to determine the correlation, dividing the pixel values to obtain minute differences and the like.

The multispectral remote sensing data in pixel form may then be georeferenced according to the curvature of the earth's surface. This step may include associating the earth observation data in pixel form with earth surface coordinates and warping the earth observation data in pixel form to the curvature of the earth's surface. The earth observation data in pixel form may be georeferenced using various interpolation techniques, such as one encoded in ArcView available from ESRI from Redlands, Calif.

At step 330, the 2D geologic model of the near surface layer of interest may be merged with a digital elevation model (DEM) of the near surface layer of interest to form or generate a three dimensional (3D) geologic model of the near surface layer of interest. DEM is a digital representation of ground surface topography or terrain. As such, the DEM provides topographical map information of the near surface layer of interest. DEM may also be known as a digital terrain model (DTM). A DEM can be represented as a raster (a grid of squares) or as a triangular irregular network. DEMs are commonly built using remote sensing techniques; however, they may also be built from land surveying. In this step, surface lithology may be converted into surface geomorphology. In one implementation, the DEM may be added to the GIS database. The geologic cross section, which may be obtained from geologic maps, may be used to identify the locations in which the surface rocks outcrop in profiles and profile photos are to be taken. The DEM provides the vertical dimension of the near surface layer of interest, depending on the outcrops that can be identified on the near surface layer of interest. In one implementation, a sequence of such outcrops may be selected. For each outcrop, a digital photo may be taken, which captures the stratigraphy of the outcrop. The top and bottom of the profile may then be measured by global positioning system (GPS) methods and the geographic data may be merged with the digital photo file to generate geotagged outcrop photos. The information available at this stage in the GIS database allows georeferencing the outcrop photos with the stratigraphic column and the near-surface geologic model.

The detailed outcrop structure may be correlated with the stratigraphic column. The geologic information available for the strata may be used to assist in the estimate of the elastic properties of the strata required to convert the geologic model into elastic models.

At step 340, a 3D elastic geologic model of the near surface layer of interest may be generated. In one implementation, standardized elastic rock properties (i.e., Vp for P-waves, Vs for S-waves and density) may be added to the 3D geologic model of the near surface layer of interest to convert the 3D geologic model into the 3D elastic geologic model. The standardized elastic rock properties may be added to the GIS database.

At step 350, the 3D elastic geologic model may be calibrated. In one implementation, the 3D elastic geologic model may be calibrated with acquired seismic data. In such an implementation, a surface wave modeling, such as Rayleigh, Love and the like, may be applied to the 3D elastic geologic model to generate a synthetic shot record in the offset time domain. Notably, the synthetic shot record does not contain any reflection data. The synthetic shot record may then be compared with the acquired shot record of seismic data. In one implementation, the synthetic shot record may be compared only with the coherent noise portion of the acquired shot record. If it is determined that the synthetic shot record differs from the acquired shot record, then the 3D elastic geologic model may be adjusted. In one implementation, a shift may be applied in the offset time domain to adjust the 3D elastic geologic model.

In another implementation, the 3D elastic geologic model may be calibrated with the acquired shot record of seismic data as follows. Coherent noise in the near surface layer may be extracted from the acquired seismic data. A surface wave inversion (e.g., Rayleigh, Love and the like) may then be applied to the coherent noise to generate Vp for P-waves, Vs for S-waves, density and depth (thickness). These values (Vp, Vs, density and depth) may then be compared against the 3D elastic geologic model. If it is determined that these values (Vp, Vs, density and depth) differ from the 3D elastic geologic model, then the 3D elastic geologic model may be adjusted.

In addition to seismic data, the 3D elastic geologic model may also be calibrated with non seismic data, such as electromagnetic, magnetic, electric, gravity, magneto-telluric or radar measurements. In such an implementation, the 3D elastic geologic model may be compared with the non seismic data. If it is determined that the 3D elastic geologic model varies from the non seismic data, then the 3D elastic geologic model may be adjusted.

In one implementation, a modal energy distribution may be computed for the near surface layer of interest. The modal energy distribution may be used to consider guided waves traveling within the near surface layer of interest. The modal energy distribution may be compared with the 3D elastic geologic model. If it is determined that the 3D elastic geologic model varies from the modal energy distribution, then the 3D elastic geologic model may be adjusted. In another implementation, the full elastic wavefield modes, including surface wave (e.g., Rayleigh, Love, etc.) modes, refracted (interface) wave modes and guided wave modes, may be considered.

After calibration, the 3D elastic geologic model may be used in seismic data processing. In one implementation, the 3D elastic geologic model may be used to generate a perturbation correction model. In another implementation, the 3D elastic geologic model may be used for quality control for source and receiver data since the elastic data provide coupling conditions.

Various techniques described above have many benefits. For instance, the inclusion of real-surface and near-surface geology into the velocity model for perturbation correction and its calibration with geophysical field data may provide more appropriate perturbation corrections of the field data, which may result in better continuity of the seismic reflectors, and consequently, the 3D seismic image. The representation of all data in a GIS database offers the opportunity to correlate geologic and geophysical data for data quality control during seismic data acquisition. During processing, quality control attributes obtained during surface-consistent processes, such as deconvolution, can be correlated with the elastic model and checked for their consistency.

Figure 5:
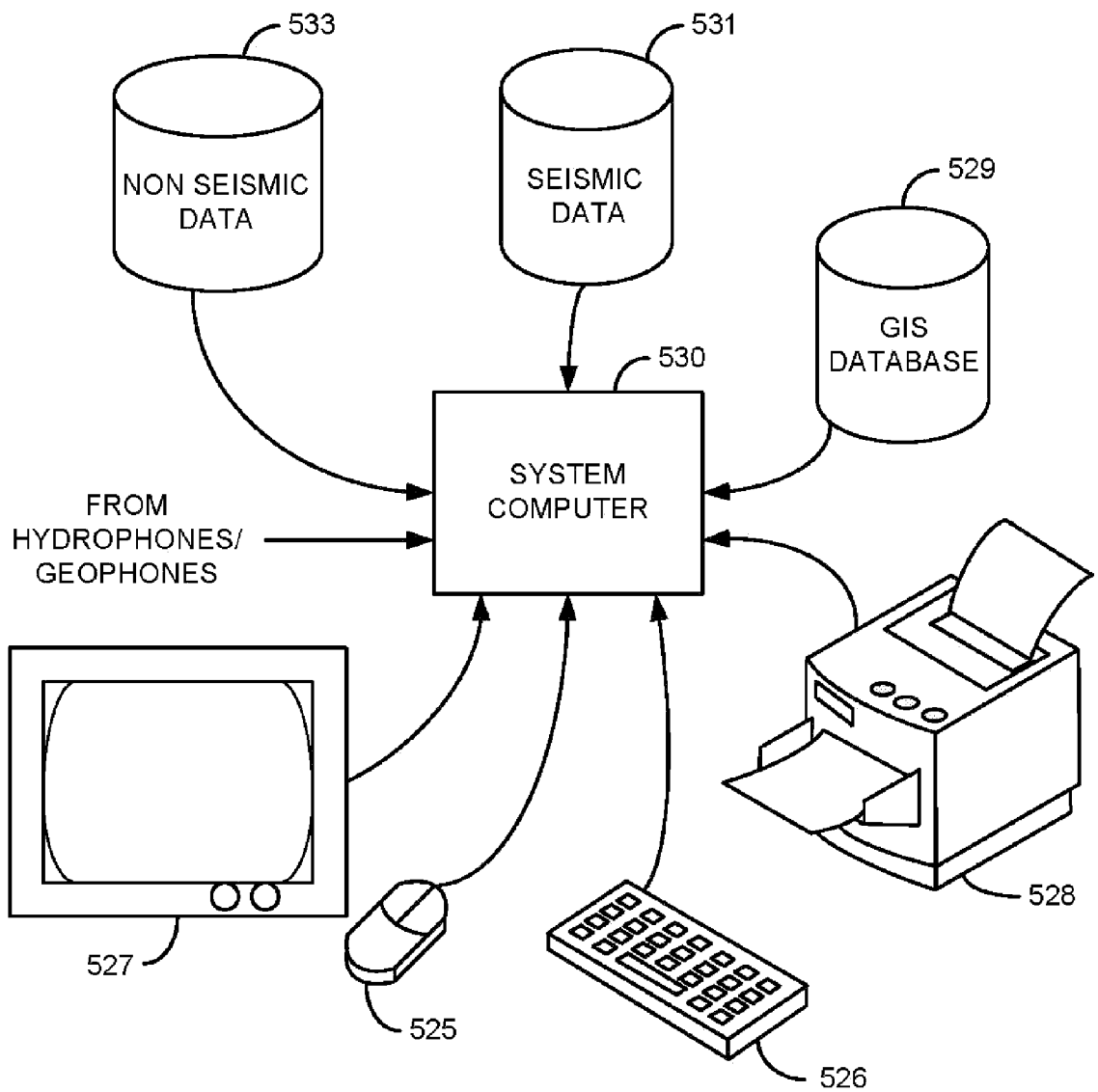
FIG. 5 illustrates a computing system, into which implementations of various technologies described herein may be implemented.

FIG. 5 illustrates a computing system 500, into which implementations of various technologies described herein may be implemented. The computing system 500 may include one or more system computers 530, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 530 may be in communication with disk storage devices 529, 531, and 533, which may be external hard disk storage devices. It is contemplated that disk storage devices 529, 531 and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from the receivers may be stored in disk storage device 531 and non seismic data may be stored in disk storage device 533. The system computer 530 may retrieve the appropriate data from the disk storage device 531 and 533 to process seismic data according to program instructions that correspond to implementations of various technologies described herein. The program instructions may be written in a computer programming language, such as C++, Java and the like. The program instructions may be stored in a computer-readable medium, such as program disk storage device 533. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 530 may present output primarily onto graphics display 527, or alternatively via printer 528. The system computer 530 may store the results of the methods described above on disk storage 529, which may be referred to as the GIS database. The keyboard 526 and the pointing device (e.g., a mouse, trackball, or the like) 525 may be provided with the system computer 530 to enable interactive operation.

The system computer 530 may be located at a data center remote from the survey region. The system computer 530 may be in communication with the receivers (either directly or via a recording unit, not shown), to receive signals indicative of the reflected seismic energy. These signals, after conventional formatting and other initial processing, may be stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a three dimensional (3D) model of a near surface layer, comprising:
    generating a one dimensional (1D) geologic model of the near surface layer with a computer system;
    converting the 1D geologic model to a two dimensional (2D) geologic model of the near surface layer;
    converting the 2D geologic model to a three dimensional (3D) geologic model of the near surface layer;
    converting the 3D geologic model to a 3D elastic geologic model of the near surface layer;
    applying a surface wave modeling to the 3D elastic geologic model to generate a synthetic shot record in an offset time domain;
    comparing the synthetic shot record with an acquired shot record of seismic data; and
    adjusting the 3D elastic geologic model if it is determined that the synthetic shot record varies from the acquired shot record.

2. The method of claim 1, wherein generating the 1D geologic model comprises identifying the near surface layer in a geological map.

3. The method of claim 1, wherein generating the 1D geologic model comprises identifying the near surface layer in a stratigraphic column.

4. The method of claim 1, wherein converting the 1D geologic model to the 2D geologic model comprises merging multispectral remote sensing data with the 1D geologic model to generate a surface lithology map.

5. The method of claim 1, further comprising georeferencing and importing the 2D geologic model into a geographic information system (GIS) database.

6. The method of claim 1, wherein converting the 2D geologic model to the 3D geologic model comprises merging a digital elevation model (DEM) of the near surface layer with the 2D geologic model.

7. The method of claim 1, wherein converting the 3D geologic model to the 3D elastic geologic model comprises adding standardized elastic rock properties to the 3D geologic model.

8. The method of claim 1, wherein adjusting the 3D elastic geologic model comprises applying a shift in the offset time domain.

9. The method of claim 1, wherein the surface wave modeling is a Rayleigh wave modeling.

10. The method of claim 1, wherein comparing the synthetic shot record with an acquired shot record of seismic data comprises:
    comparing the synthetic shot record with only a coherent noise portion of the acquired shot record.

11. A method for generating a three dimensional (3D) model of a near surface layer, comprising:
    generating a one dimensional (1D) geologic model of the near surface layer with a computer system;
    converting the 1D geologic model to a two dimensional (2D) geologic model of the near surface layer;
    converting the 2D geologic model to a three dimensional (3D) geologic model of the near surface layer;
    converting the 3D geologic model to a 3D elastic geologic model of the near surface layer;
    extracting coherent noise in the near surface layer from an acquired shot record of seismic data;
    applying a surface wave inversion to the coherent noise to generate P-wave velocity (Vp), S-wave velocity (Vs), density and depth values;
    comparing the Vp, Vs, density and depth values with the 3D elastic geologic model; and
    adjusting the 3D elastic geologic model if it is determined that the Vp, Vs, density and depth values vary from the 3D elastic geologic model.

12. The method of claim 11, further comprising calibrating the 3D elastic geologic model with non seismic data.

13. The method of claim 12, wherein the non seismic data comprises electromagnetic, magnetic, electric, gravity, magneto-telluric, radar measurements or combinations thereof.

14. A method for generating a three dimensional (3D) model of a near surface layer, comprising:

generating a one dimensional (1D) geologic model of the near surface layer with a computer system;

converting the 1D geologic model to a two dimensional (2D) geologic model of the near surface layer;

converting the 2D geologic model to a three dimensional (3D) geologic model of the near surface layer;

converting the 3D geologic model to a 3D elastic geologic model of the near surface layer;

computing a modal energy distribution of the near surface layer;

comparing the modal energy distribution with the 3D elastic geologic model; and adjusting the 3D elastic geologic model if it is determined that the modal energy distribution varies from the 3D elastic geologic model.

15. The method of claim 14, further comprising calibrating the 3D elastic geologic model with an acquired shot record of seismic data.

16. A non-transitory computer-readable medium having stored thereon computer-executable instructions which, when executed by a computer, cause the computer to:

generate a one dimensional (1D) geologic model of a near surface layer;

convert the 1D geologic model to a two dimensional (2D) geologic model of the near surface layer;

convert the 2D geologic model to a three dimensional (3D) geologic model of the near surface layer;

convert the 3D geologic model to a 3D elastic geologic model of the near surface layer;

apply a surface wave modeling to the 3D elastic geologic model to generate a synthetic shot record in an offset time domain;

compare the synthetic shot record with an acquired shot record of seismic data; and adjust the 3D elastic geologic model if it is determined that the synthetic shot record varies from the acquired shot record.

17. A computer system, comprising:

a processor; and a memory comprising program instructions executable by the processor to:

generate a one dimensional (1D) geologic model of a near surface layer;

merge multispectral remote sensing data with the 1D geologic model to generate a two dimensional (2D) geologic model of the near surface layer; and merge a digital elevation model (DEM) of the near surface layer with the 2D geologic model to generate a three dimensional (3D) geologic model of the near surface layer;

add standardized elastic rock properties to the 3D geologic model to generate a 3D elastic geologic model of the near surface layer;

calibrate the 3D elastic geologic model with seismic data, non seismic data or both;

apply a Rayleigh wave modeling to the 3D elastic geologic model to generate a synthetic shot record in an offset time domain;

compare the synthetic shot record with an acquired shot record; and adjust the 3D elastic geologic model if it is determined that the synthetic shot record varies from the acquired shot record.

18. The computer system of claim 17, wherein the multispectral remote sensing data comprise maps obtained from satellite or airplane based electromagnetic sensors.

\* \* \* \* \*